(12) United States Patent
Curtis et al.

(10) Patent No.: US 6,614,897 B1
(45) Date of Patent: Sep. 2, 2003

(54) SERVICE IN A COMMUNICATIONS NETWORK

(75) Inventors: Jonathan D Curtis, Suffolk (GB); Martin D Cookson, Cambridgeshire (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 09/623,164

(22) PCT Filed: Mar. 17, 1999

(86) PCT No.: PCT/GB99/00818

§ 371 (c)(1), (2), (4) Date: Aug. 28, 2000

(87) PCT Pub. No.: WO99/49669

PCT Pub. Date: Sep. 30, 1999

(30) Foreign Application Priority Data

Mar. 20, 1998 (EP) .............................. 98302114

(51) Int. Cl.⁷ .............................. H04M 3/42; H04M 7/00
(52) U.S. Cl. .............................. 379/210.01; 379/221.09; 379/221.01; 379/212.01
(58) Field of Search ...................... 379/210.01, 211.02, 379/212.02, 221.01, 221.08

(56) References Cited

U.S. PATENT DOCUMENTS 5,479,495 A * 12/1995 Blumhardt .................. 379/207
5,572,583 A * 11/1996 Wheeler, Jr. et al. ....... 379/207
5,590,186 A * 12/1996 Liao et al. .................. 379/210

FOREIGN PATENT DOCUMENTS

| EP | 0604042 A1 | 6/1994 |
| EP | 0750432 A1 | 6/1995 |
| WO | WO 96/13927 | 5/1996 |
| WO | WO 96/14704 | 5/1996 |

* cited by examiner

Primary Examiner—Ahmad F. Matar
Assistant Examiner—Hector Agdeppa
(74) Attorney, Agent, or Firm—Nixon & Vanderhye P.C.

(57) ABSTRACT

A call from a calling party to a first called party in a telecommunications network is initiated via a network switch. Subsequently a leg of the call from the network switch to the first called party is released. Data identifying a second called party is transmitted from the first called party to a network control platform. The network control platform correlates the data transmitted and the respective call earlier made and controls the network switch to now route the earlier call to the second called party.

9 Claims, 5 Drawing Sheets

Take and Back Transfer using Three Party Call Facility

Take and Back Transfer by Tromboning Call via Service Platform

SERVICE IN A COMMUNICATIONS NETWORK

BACKGROUND TO THE INVENTION

1. Field of the Invention

The present invention relates to a communications network, and in particular to a network in which a party at the edge of the network takes a call and subsequently transfers the call to another party.

2. Related Art

Commonly, service providers in a network such as the PSTN (Public Switched Telephony Network) need to take a call from a calling party, carry out some transaction with the calling party and then route the call to another number. For example, BT operates a service known as ACE which uses a voice recognition platform to provide customers with information relating to their telephone bills. After the customer has received the relevant information, they are offered the option of being connected to a human operator. If the customer takes up this option, the platform then needs to route the call to the appropriate number for the human operator. This operation of taking a call at one number and subsequently routing it to another number is known as take back and transfer. Hitherto, take back and transfer has been implemented using switched-based three party services. The service provider has a switch function within their service platform. This switch function is used to route the incoming call onwards to the new destination. This approach, which is known as tromboning, has a number of disadvantages. One disadvantage is that the called customer is responsible for the payment of the second leg of the call. A further disadvantage is that two circuits in the telecommunications network are tied up for the duration of the call.

SUMMARY OF THE INVENTION

According to a first aspect of the present invention, there is provided a method of operating a telecommunications network comprising:

(a) initiating a call from a calling party to a first called party via a network switch;

(b) subsequently releasing a leg of the said call from the network switch to the first called party;

(c) transmitting from the first called party to a network control platform data identifying a second called party;

(d) at the network control platform:
   i. correlating the data transmitted in step (c) and the respective call made in step (a).
   ii. controlling the network switch to route the call initiated in step (a) to the second called party.

The present invention provides a new way of implementing a take back and transfer function. This is done in such a way that it can be controlled from the edge of the network without requiring any special equipment at the first called party, who typically may be a service provider. The service can be invoked simply using a normal telephone, or, for example, by minor modifications to control scripts running on an IVR (intelligent voice response) platform. At the same time, the method avoids having two circuits tied up simultaneously, and also ensures that the entire cost of the call is billed to the calling party. These advantages are achieved by controlling a network switch to release the leg of the call from the switch to the first called party once the transactions between the calling party and the first called party are completed. Then in a separate communication from the called party to a network control, the first called party communicates the identity of the number to which the call is to be transferred. The network control platform correlates this information with the original call and connects the call through to the final destination.

The information transmitted in step (c) may be communicated to the network control platform via a data communications network. For example, the service provider may have an Internet connection to the service platform and may transfer the necessary data in this way. Preferably however in step (c) the data is transmitted by making a call from the first called party to the network control platform via the telecommunications network. This preferred approach has the advantage that the first called party then needs no additional equipment or interfaces.

Preferably the telecommunications network has an IN (Intelligent Network) architecture, and the network control platform is a service control point.

The present invention is particularly effective when implemented using IN technology. Then the intelligence for the network control platform may be located at one or more service control points which then arm respective switches or service switching points (SSP) to detect the appropriate points in the call.

Preferably in step (a) the call is registered at the network control platform. In this preferred implementation, the call is registered at the outset at the network control platform. The control platform is then primed to detect the release of the call by the first called party, and then to hold, pending receipt of data identifying the second called party, the first leg of the call from the calling party to the network switch.

Preferably on the said leg of the call being released in step (b) the network control platform starts a timer, and the leg of the call from the calling party to the network switch is held until the said timer has expired.

According to a second aspect of the present invention, there is provided a network control platform for use in a method in accordance with the first aspect, the network control platform comprising:

means for registering a call initiated by a calling party via a network switch to a first called party;

a signalling interface for receiving from the first called party data identifying a second called party;

means for correlating the data received from the first called party and a call registered by the said means for registering; and control means responsive to the said means for correlating and arranged to output a control signal to cause a network switch to switch the call to a second call party.

Preferably the network control platform further comprises means for detecting when a call registered in the means for registering is released by the first called party; and a timer responsive to the said means for detecting;

in use the network control means holding a leg of a call registered in the means for registering until the said timer has timed out.

BRIEF DESCRIPTION OF THE DRAWINGS

Methods and apparatus embodying the present invention will now be described in further detail, by way of example only, with reference to the accompanying drawings in which.

DETAILED DESCRIPTION OF EXEMPLARY EMBODIMENTS

Figure 1A:
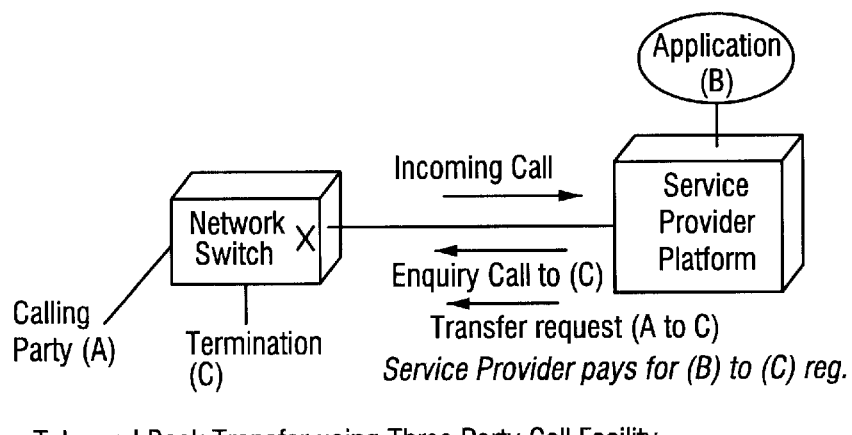
FIGS. 1a and 1b are schematics of prior art networks.
Figure 1B:
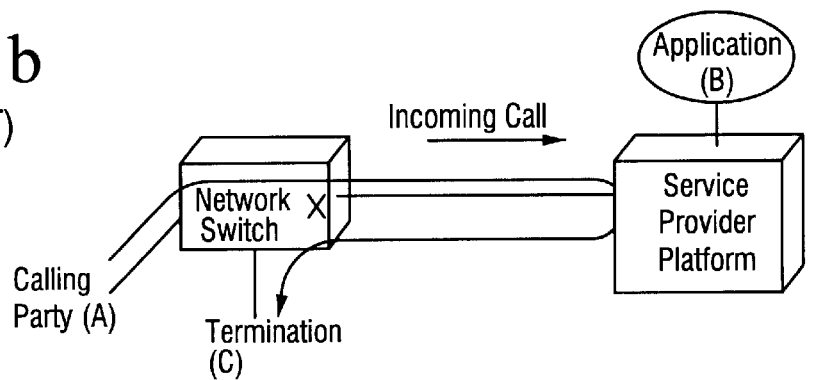

FIG. 1a shows the steps involved in a prior art take back and transfer facility and FIG. 1b indicates the path taken by the resulting three-party connection. In this prior art system, a calling party A makes a call via a network switch to a service provider. An application B running on a service provider; platform carries out a transaction with the calling party. At the completion of this transaction, in order to transfer the call, the service provider platform makes an enquiry call via the network switch to a second called party or "termination" party C. While this enquiry call is made, the incoming call is held by the service provider. Subsequently, the service provider transmits a transfer request to the network switch. As a result of this transfer request, a connection is established via the network switch and the service provider platform to the termination C. This form of connection is known as "tromboning" since, as can be seen in FIG. 1b, the resulting circuit connection has the appearance of a trombone slide.

Figure 2:
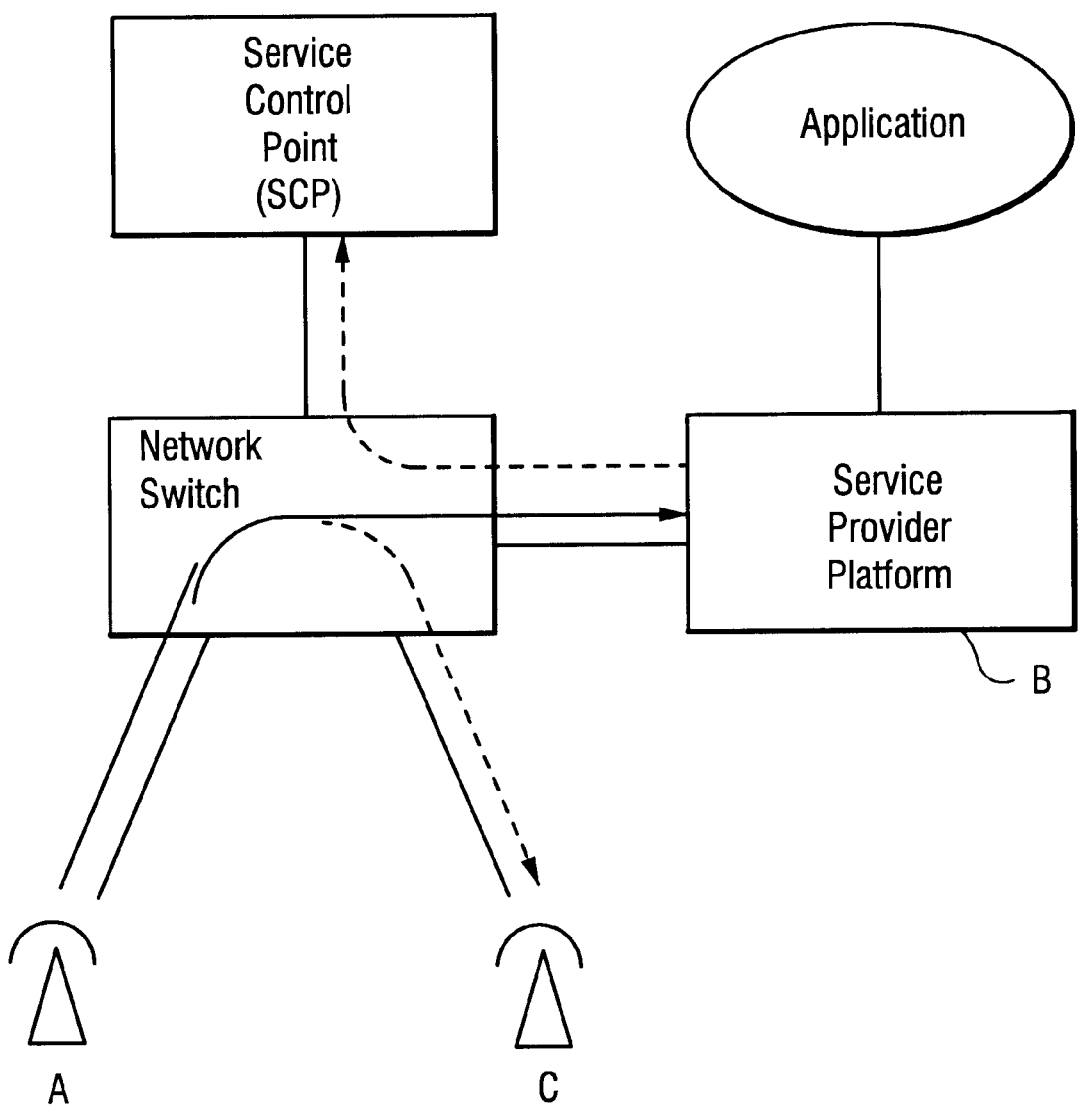
FIG. 2 is a schematic of a first network embodying the present invention.

FIG. 2 shows schematically the operation of a network embodying the present invention. The network is conveniently embodied in a system in which control intelligence is separated from the network switch and is located in a service control point (SCP). As in the previous example, the calling party initially makes a call to the service provider. Now however, when the transaction with the service provider is completed, the call is released by the service provider. While the leg of the call from the calling party A to the network switch is still being held, the service provider B communicates to the service control point (SCP) the identity of the termination party C. The service control point controls the network switch accordingly to route the call directly from A to C.

Figure 3:
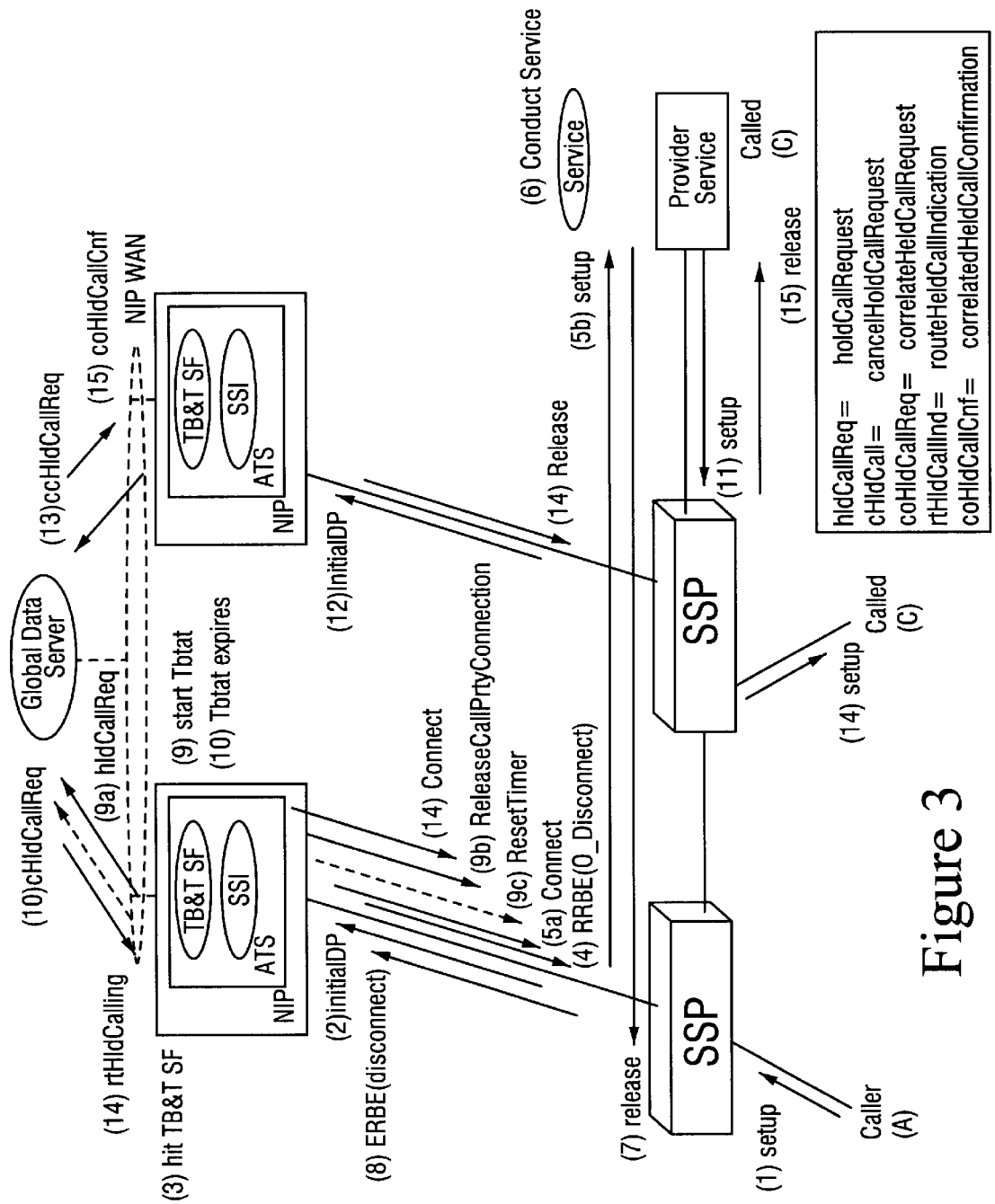
FIG. 3 is a schematic of a second network embodying the present invention with message flows indicated.

FIG. 3 illustrates in detail the procedures outlined above with respect to FIG. 2. The network of FIG. 3 includes two network switches termed SSP (service switching points), two service control points termed NIP (network intelligence platforms) and a global data server (GDS) which is connected in common to all the NIPs by a wide area network (WAN).

The method will now be described with reference to the message flows indicated on the Figure. Initially, caller A calls the number of the service provider and a set-up message is sent to a local SSP(1). An initial DP operation (2) as defined in INAP (intelligent networks application protocol) is sent from the SSP to that NIP which is associated with the SSP. Within the NIP, the service number dialled by caller A is used to select a call plan (3) that includes a service feature SF designed to implement the take back and transfer (TB&T) method of the present invention. The NIP then sends a RequestReportBCSMEvent (4) to the SSP. This arms an Event Detection Point (EDP) for O_Disconnect (Interrupted). O_Disconnect is one type of event which can be armed within the INAP protocol. It can be armed independently on both the calling and called parties of the call. This event is activated when the chosen party of the call initiates the clearing of the call (from their end). In this example, we arm the event on the called party (leg 2/B party). This is to detect when the first called party clears.

INAP events can be armed in either Interrupted or Notify mode. Interrupted means that when the event is activated the SCP regains control of the call, allowing further actions to be performed on the call. Notify mode simply indicates that the event has occurred, but the call progresses without the SCP regaining control. In the context of the O_Disconnect event, arming it as interrupted stops the call from automatically ending as a result of the called party hanging up. This then allows a new called party to be connected to the caller using the INAP connect operation.

An INAP Connect operation (5) is used to route the call to the service provider at the destination number associated with the service feature.

Once the call has been connected to the service provider, the relevant service is carried out (6). For example, an interactive voice response (IVR) platform located at the service provider may play to the customer a spoken menu of options, for example for different account enquiries. As part of the menu, or subsequently at a later stage in the operation of the service, the customer is offered the option of being connected to a human operator located at a different site in the network. When this option is taken up, then the take back and transfer function is used to transfer the call to called party C, as described below.

The service provider releases the call (7). This triggers the previously armed detection point at the SSP, and causes an EventReportBCSMEvent to be sent back from the SSP to the NIP(8). The NIP starts a timer (Ttbat) and sends a holdCallRequest message (9) to the global data server (GDS). This message contains the termination number of the service provider. The NIP sends a ReleaseCallPartyConnection operation to the SSP. The SSP is then in the waitingForInstructions state and, in accordance with the INAP protocol, the NIP is allowed to hold the call in this state for up to six seconds. If six seconds is not long enough for a second call to be made and to be correlated with the first call, then the waitingForInstructions timer may be extended by using an INAP ResetTimer. A ResetTimer message is sent from the NIP to the SSP. In an alternative embodiment, instead of the SSP being left in the waitingForInstructions state, the SSP connects the call to an intelligent peripheral (IP) which plays an announcement to the calling party. In this case there is no intrinsic limit on the time for which the call is held.

If the timer Ttabt expires, it is assumed that the TB&T service is not required for this call (10). The call is released and a cancelHoldCallRequest is sent to the global data server. Similarly, if the calling party clears before a connection to called party C has been established, the cancelHoldCallRequest is sent to the global data server. Otherwise, the service provider initiates a new call (11). This is to a dedicated service number, and may be either a free call or a paid call depending on the billing arrangements for the service. The service number dialled by the service provider includes the identity of the destination to which the held call is to be routed. This destination number may be included explicitly. For example, the service provider might dial 0800 123 01473 648174, where "0800 123" is the number for the service and "01473 648174" is the number for called party C. Alternatively, the service provider may, during a set-up procedure for the TB&T service, register with the NIP a number of destination numbers which are to be used with the service. The NIP then returns to the service provider 4-digit identification codes which are used to reference the different destination numbers. For example, destination 01473 648174 may have reference code 0001. In this case, the service provider dials 0800 123 0001.

The call from the service provider triggers at the SSP which is local to the service provider and an InitialDP(initial detection point) event (12) is sent to the NIP associated with the SSP. This may be, as in the present example, a NIP other than the NIP which is holding the original call. The receiving NIP identifies the correlation service number, i.e. 0800 123, and sends a correlateHeldCallIndication to the global data server together with the CLI (calling line identity) of the service provider and the destination number or reference code sent by the service provider.

The global data server, on receiving the correlateHeldCallIndication from the SSP searches for a heldCall by matching the CLI of the call from the service provider and the service provider number dialled by the user in originating the first, held call. If a correlated held call is found, then a routeHeldCall Indication (13) is sent to the service feature in the original NIP. The service feature, on receiving the routeHeldCall Indication, cancels the Ttbat timer and issues a Connect operation (14) to the terminating number (C party). This completes the transfer of the call.

The second NIP receives a correlatedHeldCallConfirmation from the GDS and either sends a ReleaseCall operation (15) to the service provider (triggering a confirmation tone or announcement played to the service provider, or alternatively uses an Intelligent Peripheral (IP) to play an announcement, e.g.: "your call has been transferred to 01473 48174. Thank you".

The take back and transfer service feature is not limited to uses as a stand-alone service, but may be used together with other service features to produce a complex call plan. Also, while in the above example the first call is answered by the service provider, this need not be the case. The service provider might respond to the first call by supplying another destination number in the manner described above, but without first answering the call. This mode of operation would be appropriate, for example, when the service provider was operating a telemarketing call centre. The call centre then is able to distribute the calls to agents without first answering the call or otherwise prompting the caller, so that the call distribution process is transparent to the caller.

The service provider may be billed either through the billing associated with the TB&T plan, or via retail rates invoked when the service provider issues the correlation call request. INAP "Furnish Charging Information" messages are sent from the NIP to the relevant SSP, both in respect of the TB&T plan and for the call from the service provider. An INAP "Set Charging Information (SCI)" message is used to control the rate of charging and may be used, for example, to make the call from the service provider free.

Figure 4:
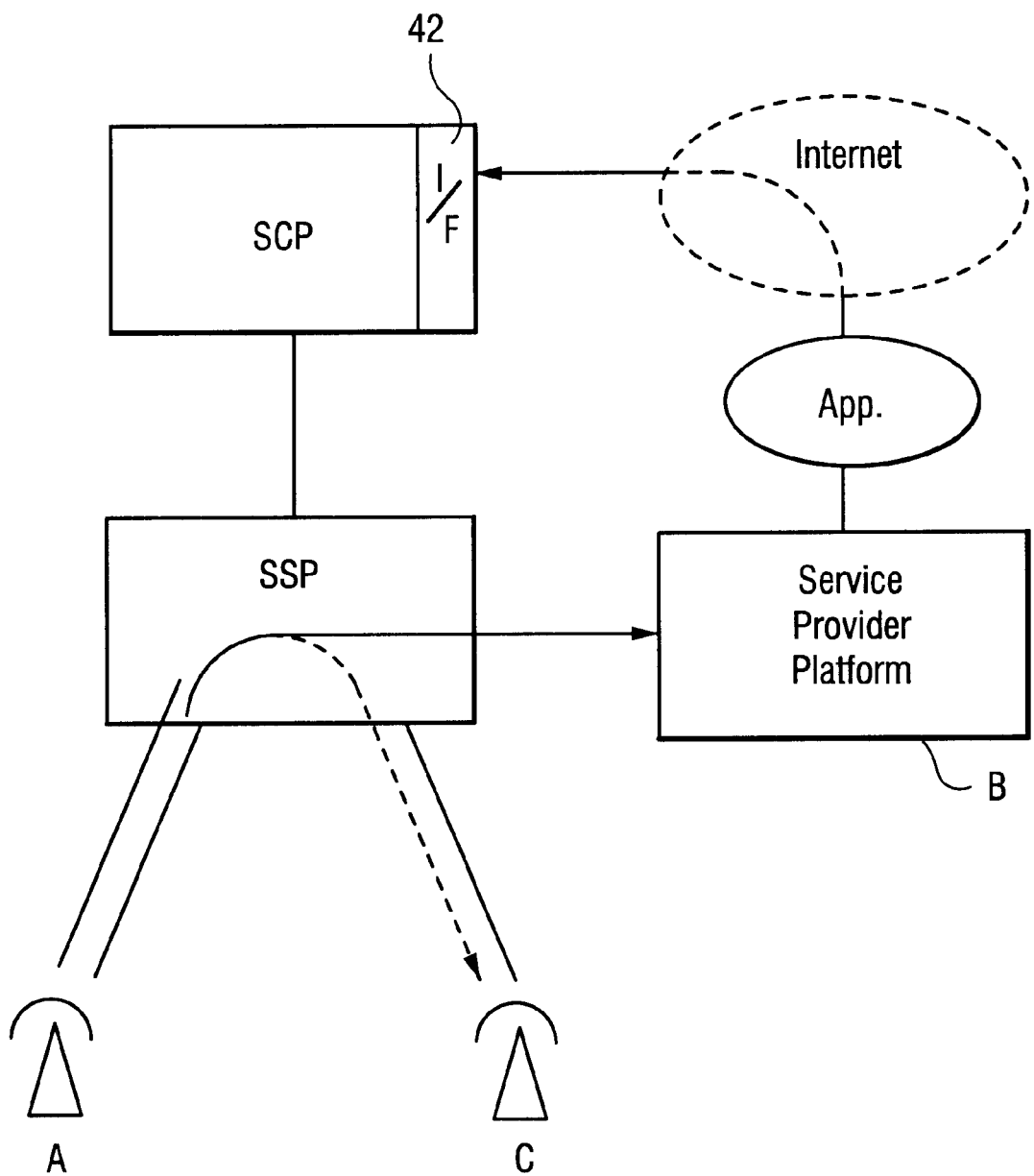
FIG. 4 is a schematic of a further alternative embodiment.

FIG. 4 shows an alternative embodiment. In this embodiment, calling party A makes a call via the SSP to a service provider B, as described previously. After executing the appropriate service application at the service provider platform, the service provider communicates a request for the call to be transferred to party C. This request is transmitted to the SCP via a data communications network. In the present example this data communications network is the internet and the communication is received at a TCP/IP interface 42 in the SCP. The request includes both the identity of party C, and data, such as the PSTN CLI, which identifies platform B. As in the previously described example, this data is used to correlate the request with the corresponding held call from party A. The SCP then causes the call to be switched to party C.

Other alternative implementations are possible. For example, the initial call from party A to the service provider might be made via the internet, with only the final connection between A and C being made via the PSTN.

Figure 5:
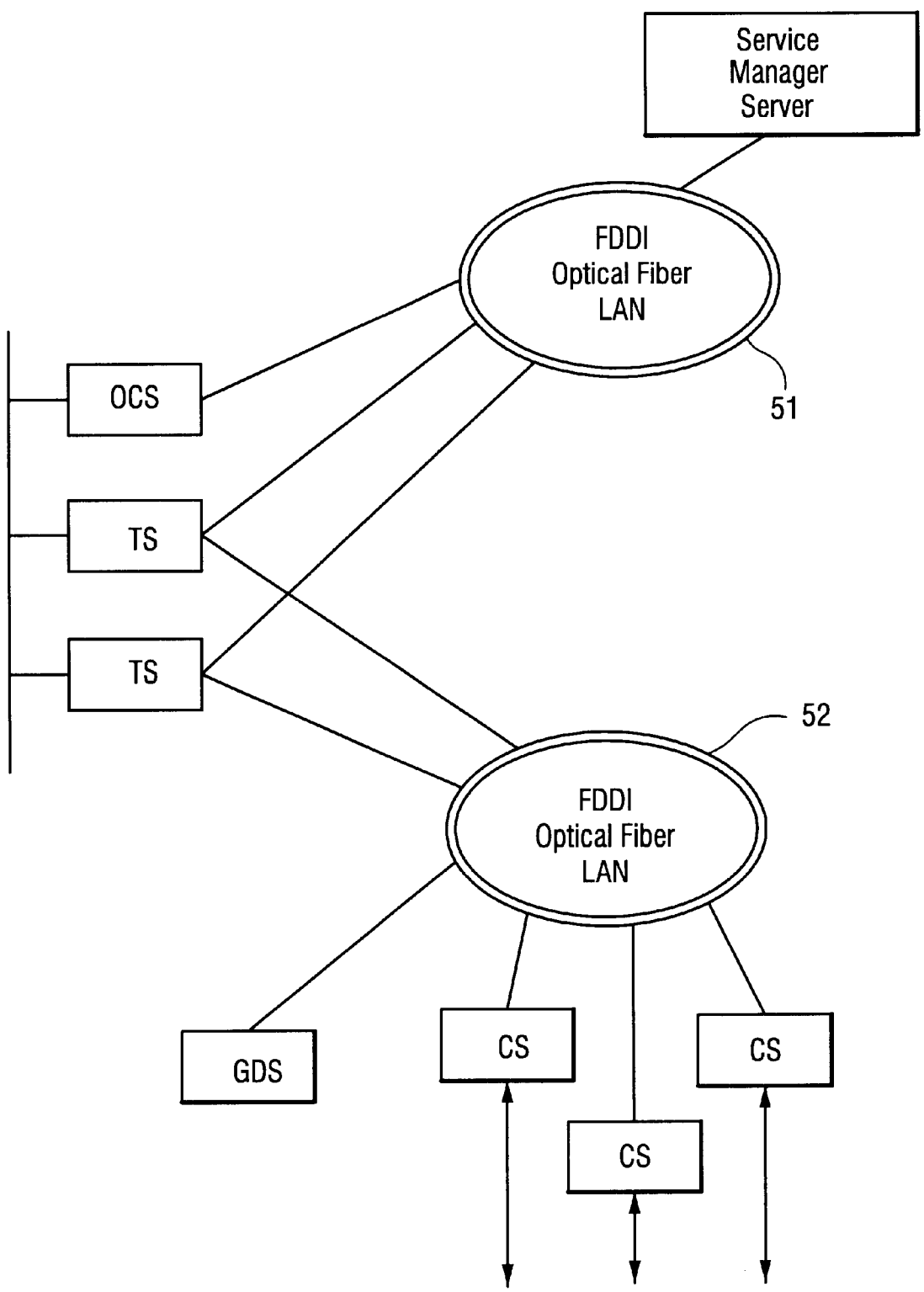
FIG. 5 is a schematic showing in further detail a network control platform for use in a network embodying the invention.

FIG. 5 shows in further detail the structure of the NIP used in the implementation discussed above. A service management server is connected via an FDDI optical fibre LAN to an overload control server (OCS) and to transaction servers (TS). The transaction servers implement advanced service control functions such as the take back and transfer (TB&T) feature described above. The OCS and transaction servers are connected via a second FDDI LAN to communications servers (CS) which are connected to the SS7 (ITU Signalling System no. 7) signalling network.

What is claimed is:

1. A method of operating a telecommunications network having an intelligent network service control point, said method comprising:
   (a) initiating a call from a calling party to a first called party via a network switch;
   (b) subsequently releasing a leg of the said call from the network switch to the first called party;
   (c) then transmitting from the first called party to a network control platform of an intelligent network service control point data identifying a second called party;
   (d) at the network control platform;
      i. correlating the data transmitted and the respective initiated call,
      ii. controlling the network switch to route the earlier initiated call to the second called party.

2. A method as in claim 1, in which the data is transmitted by making a call from the first called party to the network control platform via the telecommunications network.

3. A method as in claim 1, in which the data is communicated to the network control platform via a data communications network.

4. A method as in claim 1 further including:
   arming an interrupted detection point for detecting a disconnect event caused by the first called party, and
   holding a leg of the call from the calling party to the network switch as the leg of the call from the network switch to the first called party is released in response to the disconnect event.

5. A method as in claim 1, in which the initiated call is registered at the network control platform.

6. A network control platform for use in a telecommunications network having an intelligent network service control point said network comprising:
   (a) means for initiating a call from a calling party to a first called party via a network switch;
   (b) means for subsequently releasing a leg of the said call from the network switch to the first called party;
   (c) means for then transmitting from the first called party to a network control platform of an intelligent network service control point data identifying a second called party;
   (d) means at the network control platform:
      i. correlating the data transmitted and the respective initiated call,
      ii. controlling the network switch to route the earlier initiated call to the second called party;
   the network control platform comprising:
      means for registering a call initiated by a calling party via a network switch to a first called party;
      a signalling interface for receiving from the first called party data identifying a second called party;
      means for correlating the data received from the first called party and a call registered by the said means for registering; and control means responsive to the said means for correlating and arranged to output a control signal to cause a network switch to switch the call to a second call party.

7. A platform as in claim 6 further comprising:

means for detecting when a call registered in the means for registering is released by the first called party; and a timer responsive to the said means for detecting;

wherein the network control means holds a leg of a call registered in the means for registering until the said timer has timed out.

8. A service platform for use in a telecommunications network having an intelligent network service control point said network comprising:

(a) means for initiating a call from a calling party to a first called party via a network switch;

(b) means for subsequently releasing a leg of the said call from the network switch to the first called party;

(c) means for then transmitting from the first called party to a network control platform of an intelligent network service control point data identifying a second called party;

(d) means at the network control platform:
   i. correlating the data transmitted and the respective initiated call,
   ii. controlling the network switch to route the earlier initiated call to the second called party;

said service platform comprising:
   a) means for receiving a call from a calling party
   b) means for executing a service application in response to the said call; and
   c) means for communicating to a network control platform remote from the said service platform a request for routing the said call to another party.

9. A method of operating a telecommunications network having an intelligent network service control point, said method comprising:

(a) initiating a call from a calling party to a first called party via a network switch;

(b) subsequently releasing a leg of the said call from the network switch to the first called party;

(c) then transmitting from the first called party to a network control platform of an intelligent network service control point data identifying a second called party;

(d) controlling the network switch to route the earlier initiated call to the second called party.

* * * * *